Patented Jan. 6, 1925.

1,521,719

UNITED STATES PATENT OFFICE.

ABRAHAM L. SHERMAN, OF PECKVILLE, PENNSYLVANIA, ASSIGNOR TO ANTHRACITE REFRACTORIES COMPANY, OF PECKVILLE, PENNSYLVANIA, A CORPORATION OF PENNSYLVANIA.

REFRACTORY COMPOSITION.

No Drawing.    Application filed September 12, 1921.   Serial No. 500,153.

*To all whom it may concern:*

Be it known that I, ABRAHAM L. SHERMAN, a citizen of the United States, residing at Peckville, in the county of Lackawanna and State of Pennsylvania, have invented certain new and useful Improvements in Refractory Compositions; and I do hereby declare the following to be a full, clear, and exact description of the invention, such as will enable others skilled in the art to which it appertains to make and use the same.

This invention relates to refractory compositions of the kind that can be produced by mixing the ingredients, molding and furnacing the molded product.

The object is the production of a superior refractory material at low cost, suitable for use in fire brick, paving brick, stove and furnace linings, or in any situation where it is necessary to use materials that will not crack or crumble under heat, or disintegrate under mechanical wear or chemical action.

The composition consists of coal ashes intimately mixed with anthracite clay.

Anthracite clay, which forms a principal ingredient of the improved refractory material for which I seek a patent, is a clay peculiar to regions containing deposits of anthracite coal. It occurs in strata overlying the strata of anthracite and must be removed in order to obtain the coal lined under it. When a stratum of anthracite coal is mined the overlying stratum of clay is removed from the mine. In the anthracite coal regions of Pennsylvania this clay is removed from the mines and is piled in exceedingly abundant quantities adjacent the mines out of the way of mining operations.

Analysis of the anthracite clay forming an ingredient of this refractory material gives the following composition:

|  | Per cent. |
|---|---|
| Silica | 66.04 |
| Aluminum oxide | 21.00 |
| Iron oxide | 1.70 |
| Calcium oxide | 0. |
| Magnesium oxide | .63 |
| Sodium oxide | 1.38 |
| Potassium oxide | 3.62 |

Upon ignition this clay shows a loss of about 5.35% in weight. Anthracite clay is peculiarly adapted for the purpose in view in that the fluxes are very low; bricks or the like made from it will withstand a temperature of more than 3000° F. without fusing or disintegrating. It is, of itself, susceptible of use as a mortar for laying fire brick, as a furnace lining, or in any place where the best fire clays are used. In appearance it is very dark in color—almost black. There is no shine or glisten to it, and it is readily distinguishable by its appearance from the stratum of coal that lies beneath it in its position in nature. It is smooth and fatty in consistency, forms a good plastic substance with water and molds easily. It is distinct from the outcropping New Jersey fire clay and the fire clays of western Pennsylvania and Ohio.

The ash ingredient of the improved refractory material consists of reburnt anthracite coal ashes. In the anthracite regions of Pennsylvania anthracite coal is burned in the furnaces of the power plants for generating steam to operate the mine machinery. These ashes are deposited adjacent the mine out of the way of the mining operations and have accumulated in enormous quantities in the anthracite regions in proximity to the deposits of anthracite clay previously mentioned.

Thus, the principal ingredients, anthracite clay and coal ashes, of the refractory material claimed herein, occur in abundant quantities in proximity to each other in the anthracite coal mining regions, where they have been deposited as a waste product of mining operations.

The described clay and ashes are pulverized or otherwise reduced to an exceedingly fine texture, thoroughly mixed together, and sufficient water, hot or cold, or other suitable binder liquid added so that the material may be molded or worked plastically. The molded material is then dried and kilned or furnaced in the customary way. The amount of water or the like mixed with the finely divided solids may be variable, dependent upon conditions. Sometimes the mixed materials may have absorbed so much moisture from the air that little or no water is needed to enable the material to be molded; at other times the dryness of the atmosphere requires the addition of more water. I have found that approximately 10 parts (by weight) of water added to 100 parts of the material (by weight) is sufficient to enable the material to be properly molded.

For most purposes 45 parts of anthracite clay should be mixed with 55 parts of coal ashes (by weight) in order to secure the best product. Fire brick and molded linings are preferably so constituted. The proportions may, however, be varied, the limits being between 30 and 60 parts of clay in each 100 parts of the mixture of solids. When the plastic mixture is to be used as a mortar or cement in laying fire brick a somewhat larger proportion of clay may be used than would be most suitable for making fire brick. Where light weight is essential a smaller proportion of clay may be used.

The fire brick and linings having the described composition are found on trial to be almost free of shrinkage, to withstand high temperatures most satisfactorily, and to have the capacity to resist to a large extent the chemical action of basic slag, furnace gases, and cement clinker being burned in kilns. Fire brick and linings of the composition herein stated are much lighter than ordinary fire bricks and linings. The economy resulting in reduced freight rates, ease of handling, and the resulting efficiency of labor, and decreased weight of linings is very considerable. They are of superior strength, resist the mechanical abrasion of ashes, cinders, and other furnace charges; when heated to incandescence and cast into water they do not crack or break.

The material in the reburnt condition has undergone a chemical change in that the silicates have become combined with the aluminum of the fire clay; which combination makes the resulting brick of much greater strength and durability after the coal ashes have been reburnt. The coal ashes in themselves are of a reburnt character before having been mixed with the fire clay. These ashes are not the ordinary soft coal ashes which are found in the bulk of combustion furnaces, but are a reburnt anthracite coal ash having a decidedly greater strength after being kiln-burned than the ordinary fire clay. Upon kiln-burning ashes undergo a physical change covering different stages of vitrification until the fusion point is reached. It is at these stages of the burning that the chemical reactions take place. Reburnt anthracite ash is of a very high refractory composition having very high fusion points and all mixtures containing this have naturally become affiliated with this characteristic.

Owing to the fact that the ingredients of my improved composition are waste products deposited in proximity to each other at the mines, the cost of production is singularly low, as compared with the cost of ordinary fire brick, which is formed of fire clays that have to be specially mined. I have, thus, obtained a highly useful product from materials that have hitherto been waste products occupying valuable space.

What I claim and desire to secure by Letters Patent is:

1. A composition comprising a mixture of reburnt coal ashes and anthracite clay.

2. A composition comprising a mixture of reburnt coal ashes and anthracite clay, in the proportions of 30 to 60 parts of clay in 100 parts of the mixture by weight.

3. A composition comprising a mixture of reburnt coal ashes and anthracite clay in the proportions of substantially 45 parts of clay in 100 parts of the mixture, by weight.

4. A fire resistant manufacture composed of a furnaced mixture of reburnt coal ashes and anthracite clay.

In testimony whereof I affix my signature.

ABRAHAM L. SHERMAN.